(12) United States Patent
Suyama et al.

(10) Patent No.: US 10,878,968 B2
(45) Date of Patent: Dec. 29, 2020

(54) CHANNEL BOX

(71) Applicant: KABUSHIKI KAISHA TOSHIBA, Minato-ku (JP)

(72) Inventors: Shoko Suyama, Kawasaki (JP); Masaru Ukai, Yokohama (JP); Masayuki Uchihashi, Yokohama (JP); Hideaki Heki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 949 days.

(21) Appl. No.: 15/411,151

(22) Filed: Jan. 20, 2017

(65) Prior Publication Data

US 2017/0229195 A1    Aug. 10, 2017

Related U.S. Application Data

(63) Continuation of application No. PCT/JP2015/003644, filed on Jul. 21, 2015.

(30) Foreign Application Priority Data

Jul. 22, 2014   (JP) .................. 2014-148523

(51) Int. Cl.
*G21C 3/324*      (2006.01)
*G21C 3/322*      (2006.01)
(Continued)

(52) U.S. Cl.
CPC ............. *G21C 3/324* (2013.01); *G21C 3/322* (2013.01); *C04B 35/565* (2013.01);
(Continued)

(58) Field of Classification Search
CPC ...... G21C 3/324; G21C 3/322; C04B 35/628; C04B 35/62868; C04B 35/62839; C04B 35/565
See application file for complete search history.

(56) References Cited

U.S. PATENT DOCUMENTS 4,789,518 A * 12/1988 Batheja .................. G21C 3/32
                                                              376/353
5,356,727 A    10/1994 Grenie et al.
(Continued)

FOREIGN PATENT DOCUMENTS

AP   2012-503193 A    2/2012
DE   2511054 C2 *   8/1982   ............... G21C 3/20
(Continued)

OTHER PUBLICATIONS

Office Action dated Mar. 13, 2018 in Japanese Patent Application No. 2014-148523 with English translation, 11 pages.
(Continued)

*Primary Examiner* — Lily C Garner
(74) *Attorney, Agent, or Firm* — Oblon, McClelland, Maier & Neustadt, L.L.P.

(57) ABSTRACT

A channel box in an embodiment includes a tubular portion. The tubular portion includes a first tubular layer, a second tubular layer, and an intermediate tubular layer. The first tubular layer contains silicon carbide as a major component. The second tubular layer is in parallel to and surrounds or is surrounded by the first tubular layer and contains silicon carbide fibers and silicon carbide complexed with the silicon carbide fibers. The intermediate tubular layer is disposed between the first tubular layer and the second tubular layer and contains a solid lubricant.

18 Claims, 12 Drawing Sheets

(51) Int. Cl.
    *C04B 35/628* (2006.01)
    *C04B 35/565* (2006.01)
(52) U.S. Cl.
    CPC ...... *C04B 35/628* (2013.01); *C04B 35/62839* (2013.01); *C04B 35/62868* (2013.01); *Y02E 30/30* (2013.01)

(56) References Cited

U.S. PATENT DOCUMENTS

| | | | |
|---|---|---|---|
| 6,226,342 | B1 | 5/2001 | Micko et al. |
| 2006/0039524 | A1 | 2/2006 | Feinroth et al. |
| 2009/0032178 | A1* | 2/2009 | Feinroth ................ F28F 21/04 156/143 |
| 2009/0220040 | A1* | 9/2009 | Takagi .................... G21C 3/07 376/416 |
| 2011/0170653 | A1 | 7/2011 | Cabrero et al. |
| 2011/0268243 | A1* | 11/2011 | Hallstadius ........... C04B 35/565 376/412 |
| 2012/0201343 | A1* | 8/2012 | Ravenet ................ G21C 3/324 376/462 |
| 2014/0079879 | A1 | 3/2014 | Takagi |
| 2014/0235514 | A1 | 8/2014 | Nomura et al. |
| 2015/0057401 | A1 | 2/2015 | Suzuki et al. |

FOREIGN PATENT DOCUMENTS

| | | |
|---|---|---|
| DE | 690 24 712 T2 | 7/1996 |
| EP | 0 409 733 A1 | 1/1991 |
| ES | 2 487 648 | 8/2014 |
| FR | 2 649 974 | 1/1991 |
| JP | 62176981 A * | 8/1987 |
| JP | 3-83808 | 4/1991 |
| JP | 8-143377 A | 6/1996 |
| JP | 08143377 A * | 6/1996 |
| JP | 10-48372 | 2/1998 |
| JP | 2008-501977 | 1/2008 |
| JP | 2013-76036 A | 4/2013 |
| JP | 2013-79822 A | 5/2013 |
| JP | 2013-113682 A | 6/2013 |
| JP | 2013-529298 | 7/2013 |
| JP | 2013-173183 A | 9/2013 |
| JP | 2013-210372 | 10/2013 |
| JP | 2016135728 A * | 7/2016 |
| KR | 1020070020128 A | 2/2007 |
| WO | WO 2006/076039 A2 | 7/2006 |
| WO | WO 2011/134757 A1 | 11/2011 |
| WO | WO 2014/025060 A1 | 7/2016 |

OTHER PUBLICATIONS

International Search Report dated Aug. 25, 2015 in PCT/JP2015/003644, filed on Jul. 21, 2015 (with English Translation).
Written Opinion dated Aug. 25, 2015 in PCT/JP2015/003644, filed on Jul. 21, 2015.
Extended European Search Report dated Mar. 6, 2018 in European Patent Application No. 15825316.1, 7 pages.

* cited by examiner

CHANNEL BOX

CROSS-REFERENCE TO RELATED APPLICATIONS

This application is a continuation of prior International Application No. PCT/JP2015/003644 filed on Jul. 21, 2015, which is based upon and claims the benefit of priority from Japanese Patent Application No. 2014-148523 filed on Jul. 22, 2014; the entire contents of all of which are incorporated herein by reference.

FIELD

Embodiments described herein generally relate to a channel box.

BACKGROUND

A pressurized water reactor nuclear power plant (PWR) is constituted by a circulation cycle of passing through a steam generator, a high-pressure turbine, a low-pressure turbine, a steam condenser, a feed water pump, and a feed water heater in sequence and returning again to the nuclear reactor. In the PWR, the steam generated in the steam generator drives the high-pressure turbine and the low-pressure turbine, thereby causing the generator to operate for power generation.

In a boiling water reactor nuclear power plant (BWR), energy generated from the nuclear fission reaction of uranium in a nuclear reactor is used to boil cooling water, in which the nuclear reactor also serves as a steam generator. Uranium being the fuel is accommodated as a sintered body (fuel pellet) of uranium oxide in a fuel cladding tube, and the cooling water flows around the fuel cladding tube. A channel box is disposed to cover the surroundings of a plurality of fuel cladding tubes bundled, and is configured such that the cooling water efficiently flows around the fuel cladding tubes.

Generally, for the channel box, a Sn—Fe—Cr—Zr alloy called a zircaloy 4 or a Sn—Fe—Cr—Ni—Zr alloy called a zircaloy 2 are used because of its excellent corrosion resistance and a low neutron absorption cross-section, and use of a Zr—Nb alloy or the like is also under discussion. These zirconium base alloys generate the following reaction with surrounding moisture at high temperature.

$$Zr + 2H_2O \rightarrow ZrO_2 + 2H_2 \quad (1)$$

Here, the reaction expressed in Expression (1) is an exoergic reaction, and the zirconium base alloy accelerates the oxidation reaction in Expression (1) by the heat generated by itself, and generation of hydrogen drastically increases at a high temperature of 900° C. or higher. When the zirconium base alloy is exposed to such a high temperature in an environment where moisture exists in the nuclear reactor, a large amount of hydrogen is generated in a short time, and the hydrogen leaks out of the containment vessel, stays in the reactor building and possibly causes hydrogen explosion. For this reason, use of a ceramic material as the materials of the channel box is under discussion.

SUMMARY

However, since the ceramic material exhibits brittle fracture, the resistance to the fracture is not always high. Besides, the ceramic material complexed with fibers is higher in resistance to fracture but lower in mechanical strength than the one complexed with no fibers.

The channel box is required to have the following characteristics. First, the channel box suppresses generation of hydrogen due to the reaction with moisture in a serious accident of the nuclear reactor such as natural disaster such as tsunami or flood, and human disaster such as terror. Second, the channel box has such high strength, fracture toughness, and fracture energy as not to instantly break even if a load or a thermal shock exceeding a design basis is applied thereon.

An object to be solved by the present invention is to provide a channel box suppressing generation of hydrogen due to a reaction with moisture, and achieving a balance among strength, fracture toughness, and fracture energy.

A channel box in an embodiment includes a tubular portion. The tubular portion includes a first tubular layer, a second tubular layer, and an intermediate tubular layer. The first tubular layer contains silicon carbide as a major component. The second tubular layer is in parallel to and surrounds or is surrounded by the first tubular layer and contains silicon carbide fibers and silicon carbide complexed with the silicon carbide fibers. The intermediate tubular layer is disposed between the first tubular layer and the second tubular layer and contains a solid lubricant.

DETAILED DESCRIPTION

Figure 1:
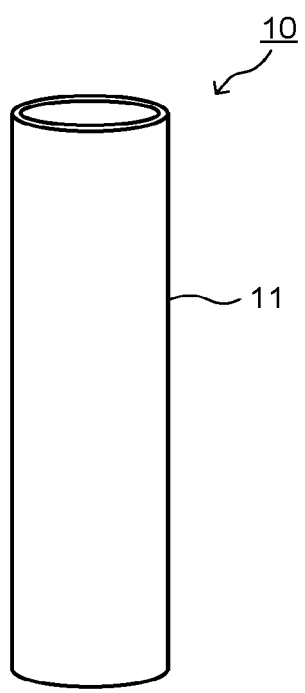
FIG. 1 is an external view illustrating a channel box in a first embodiment.

Hereinafter, an embodiment of the present invention will be described referring to the drawings.

FIG. 1 is an external view illustrating a channel box in a first embodiment. A channel box 10 in the first embodiment has a tubular portion 11 in a circular tubular shape. The channel box 10 in the first embodiment is to cover a fuel assembly for a boiling water type power reactor (BWR), and has functions of ensuring a reactor coolant flow path, guiding a control rod, and fixing and protecting a fuel rod.

Figure 2:
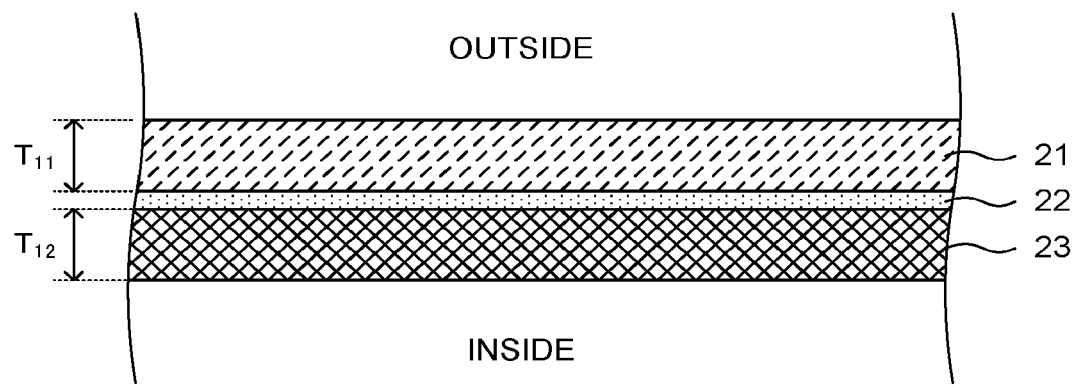
FIG. 2 is a cross-sectional view illustrating an example of a side wall part in the first embodiment.

FIG. 2 is a cross-sectional view illustrating an example of a side wall part of the tubular portion 11 in the channel box 10 in the first embodiment. As illustrated in FIG. 2, the side wall part is composed of, for example, a first layer 21, an intermediate layer 22, and a second layer 23 in order from the outside. The first layer 21 contains silicon carbide as a major component. The intermediate layer 22 is composed of a solid lubricant. The second layer 23 has silicon carbide fibers, and silicon carbide complexed with the silicon carbide fibers.

The constituent of the channel box 10 in the first embodiment is basically silicon carbide, thereby suppressing radioactivation in use. Further, the constituent of the channel box 10 in the first embodiment is basically silicon carbide, thereby suppressing generation of hydrogen due to the reaction with moisture even if the channel box 10 comes into contact with moisture in a serious accident of a nuclear reactor.

Further, the channel box 10 in the first embodiment has a structure in which the first layer 21 made of silicon carbide and the second layer 23 made of silicon carbide complexed with silicon carbide fibers via the intermediate layer 22 being an interface that weakens the bonding force, thereby achieving a balance among strength, fracture toughness, and fracture energy at a high order.

Specifically, the first layer 21 made of silicon carbide ensures the strength, and the second layer 23 made of silicon carbide complexed with silicon carbide fibers ensures the fracture toughness and the fracture energy. In particular, the arrangement of the first layer 21 and the second layer 23 via the intermediate layer 22 being an interface that weakens the bonding force functionally separates the first layer 21 and the second layer 23, effectively expressing their functions. Thus, the first layer 21 made of silicon carbide sufficiently ensures the strength required in normal time, and the second layer 23 made of silicon carbide complexed with silicon carbide fibers suppresses fracture when a load or a thermal shock exceeding a design basis is applied in a serious accident of a nuclear reactor.

Figure 3:
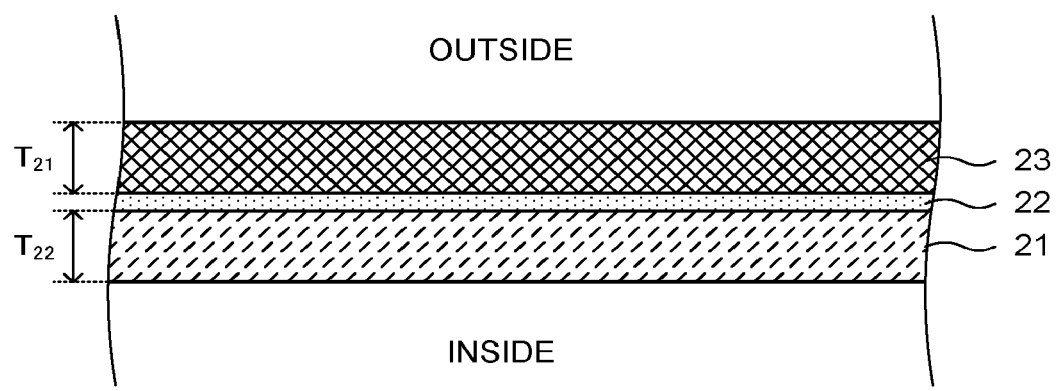
FIG. 3 is a cross-sectional view illustrating a first modification example of the side wall part in the first embodiment.

FIG. 3 is a cross-sectional view illustrating a first modification example of the side wall part. The side wall part may have the second layer 23, the intermediate layer 22, and the first layer 21 in order from the outside. Any of the first layer 21 and the second layer 23 may be disposed on the outside, and basically the same effect can be obtained.

Figure 4:
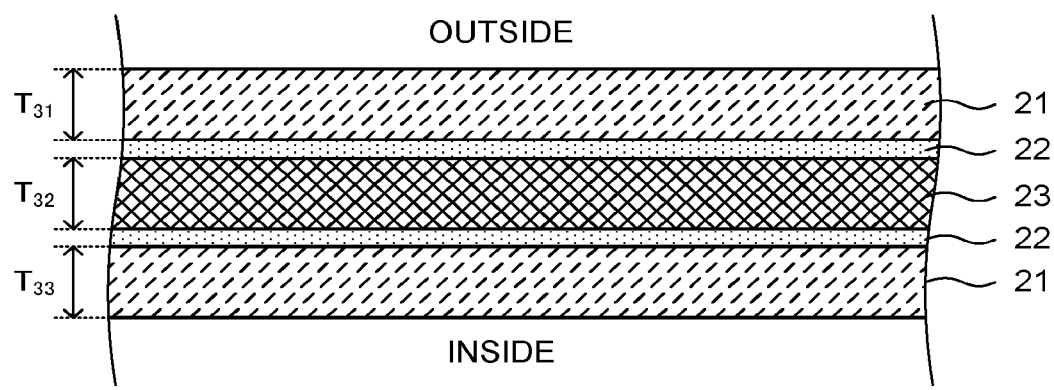
FIG. 4 is a cross-sectional view illustrating a second modification example of the side wall part in the first embodiment.
Figure 5:
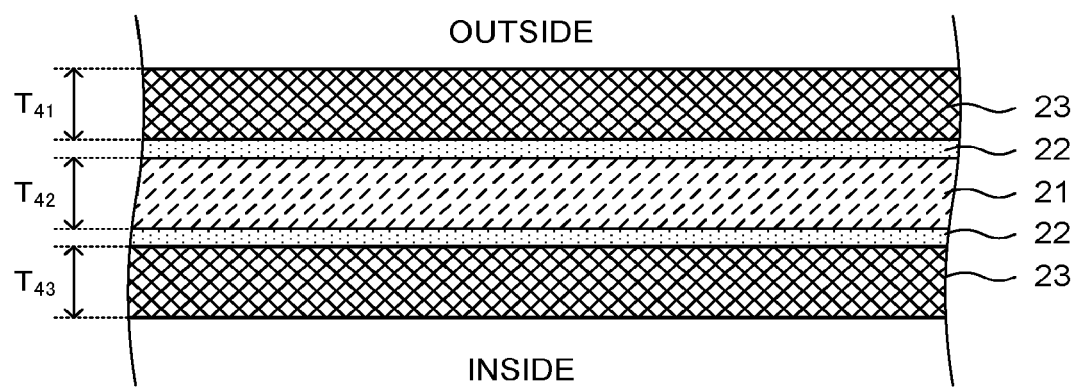
FIG. 5 is a cross-sectional view illustrating a third modification example of the side wall part in the first embodiment.

FIG. 4 is a cross-sectional view illustrating a second modification example of the side wall part, and FIG. 5 is a cross-sectional view illustrating a third modification example of the side wall part. As illustrated in FIG. 4 and FIG. 5, the number of layers in total of the number of first layers 21 and the number of second layers 23 may be three. Also in the case where the number of layers in total of the number of first layers 21 and the number of second layers 23 is three, basically the same effect as the case where the number of layers in total of the number of first layers 21 and the number of second layers 23 is two can be obtained.

Note that in the case where the number of layers in total of the number of first layers 21 and the number of second layers 23 is three, any of the first layer 21 and the second layer 23 may be on the outside, but are preferably alternately disposed in order from the outside. Further, in the case where the number of layers in total of the number of first layers 21 and the number of second layers 23 is three, preferably, the intermediate layer 22 is disposed between each first layer 21 and each second layer 23.

Specifically, in the case where the number of layers in total of the number of first layers 21 and the number of second layers 23 is three, preferably, the first layer 21, the intermediate layer 22, the second layer 23, the intermediate layer 22, and the first layer 21 are disposed in order from the outside as illustrated in FIG. 4, or the second layer 23, the intermediate layer 22, the first layer 21, the intermediate layer 22, and the second layer 23 are disposed in order from the outside as illustrated in FIG. 5.

Figure 6:
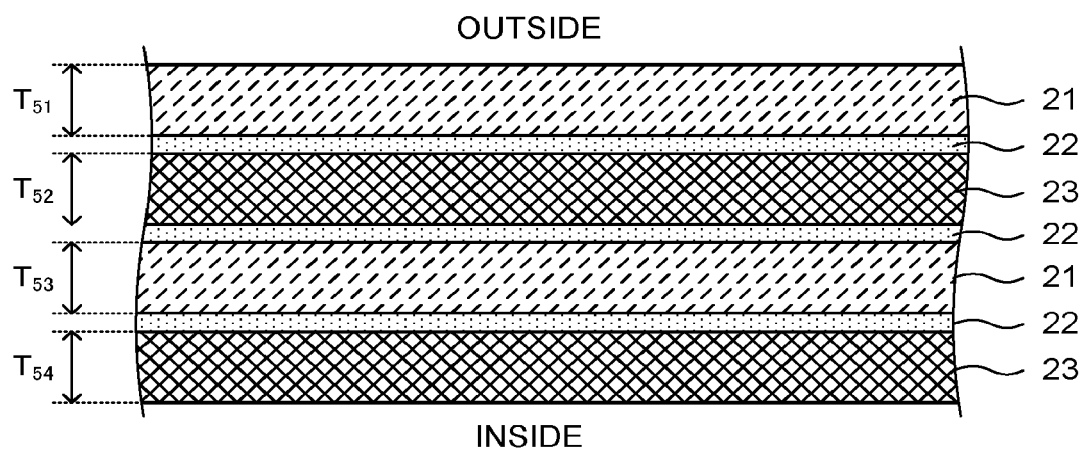
FIG. 6 is a cross-sectional view illustrating a fourth modification example of the side wall part in the first embodiment.
Figure 7:
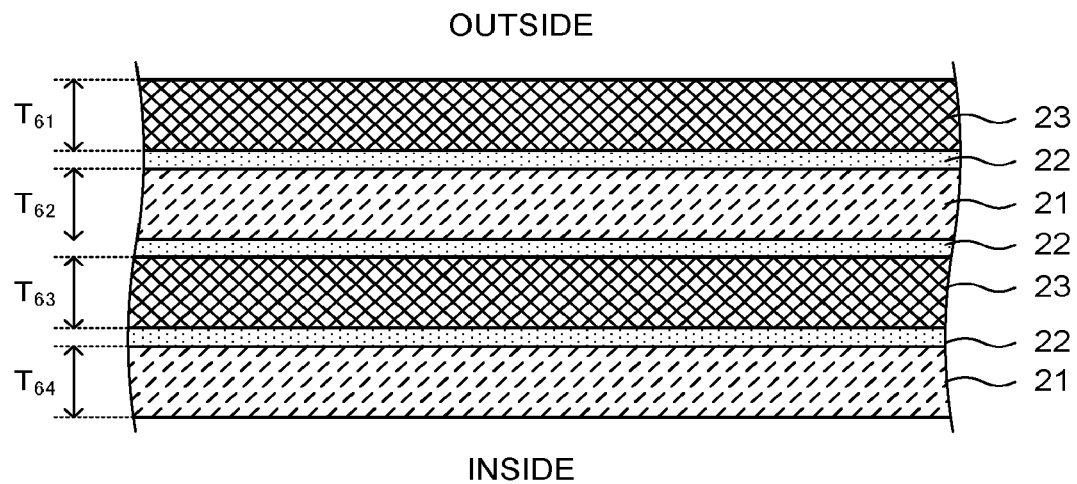
FIG. 7 is a cross-sectional view illustrating a fifth modification example of the side wall part in the first embodiment.

FIG. 6 is a cross-sectional view illustrating a fourth modification example of the side wall part, and FIG. 7 is a cross-sectional view illustrating a fifth modification example of the side wall part. As illustrated in FIG. 6 and FIG. 7, the number of layers in total of the number of first layers 21 and the number of second layers 23 may be four. Also in the case where the number of layers in total of the number of first layers 21 and the number of second layers 23 is four, basically the same effect as the case where the number of layers in total of the number of first layers 21 and the number of second layers 23 is two or three can be obtained.

Note that in the case where the number of layers in total of the number of first layers 21 and the number of second layers 23 is four, any of the first layer 21 and the second layer 23 may be on the outside, but are preferably alternately disposed in order from the outside. Further, in the case where the number of layers in total of the number of first layers 21 and the number of second layers 23 is four, preferably, the intermediate layer 22 is disposed between each first layer 21 and each second layer 23.

Specifically, in the case where the number of layers in total of the number of first layers 21 and the number of second layers 23 is four, preferably, the first layer 21, the intermediate layer 22, the second layer 23, the intermediate layer 22, the first layer 21, the intermediate layer 22, and the second layer 23 are disposed in order from the outside as illustrated in FIG. 6, or the second layer 23, the intermediate layer 22, the first layer 21, the intermediate layer 22, the second layer 23, the intermediate layer 22, and the first layer 21 are disposed in order from the outside as illustrated in FIG. 7.

Here, the number of layers in total of the number of first layers 21 and the number of second layers 23 is not necessarily limited to not less than two nor more than four, but is preferably not less than two nor more than four from the viewpoint of productivity or the like.

The average thickness of the first layer 21 and the average thickness of the second layer 23 are preferably in the following ranges according to the stacked structure. When the average thickness of the first layer 21 is larger than the following range or when the average thickness of the second layer 23 is smaller than the following range, the fracture toughness and the fracture energy are likely to decrease. Contrarily, when the average thickness of the first layer 21 is smaller than the following range or when the average thickness of the second layer 23 is larger than the following range, the strength is likely to decrease. Note that the average thickness in this description is measured by a non-destructive inspection such as X-ray or a destructive inspection such as cutting and cross-section observation.

When the first layer 21 (as a 1st layer) and the second layer 23 (as a 2nd layer) are provided in order from the outside as illustrated in FIG. 2, a ratio ($T_{12}/T_{11}$) between an average thickness ($T_{11}$) of the first layer 21 being the 1st layer and an average thickness ($T_{12}$) of the second layer 23 being the 2nd layer is preferably not less than 0.25 nor more than 1.

When the second layer 23 (as a 1st layer) and the first layer 21 (as a 2nd layer) are provided in order from the outside as illustrated in FIG. 3, a ratio ($T_{22}/T_{21}$) between an average thickness ($T_{21}$) of the second layer 23 being the 1st layer and an average thickness ($T_{22}$) of the first layer 21 being the 2nd layer is preferably not less than 1 nor more than 4.

When the first layer 21 (as a 1st layer), the second layer 23 (as a 2nd layer), and the first layer 21 (as a 3rd layer) are provided in order from the outside as illustrated in FIG. 4, a ratio ($T_{32}/T_{31}$) between an average thickness ($T_{31}$) of the first layer 21 being the 1st layer and an average thickness ($T_{32}$) of the second layer 23 being the 2nd layer is preferably not less than 0.5 nor more than 2, and a ratio ($T_{33}/T_{31}$) between the average thickness ($T_{31}$) of the first layer 21 being the 1st layer and an average thickness ($T_{33}$) of the first layer 21 being the 3rd layer is preferably not less than 0.5 nor more than 2.

When the second layer 23 (as a 1st layer), the first layer 21 (as a 2nd layer), and the second layer 23 (as a 3rd layer) are provided in order from the outside as illustrated in FIG. 5, a ratio ($T_{42}/T_{41}$) between an average thickness ($T_{41}$) of the second layer 23 being the 1st layer and an average thickness ($T_{42}$) of the first layer 21 being the 2nd layer is preferably not less than 1 nor more than 4, and a ratio ($T_{43}/T_{41}$) between the average thickness ($T_{41}$) of the second layer 23 being the 1st layer and an average thickness ($T_{43}$) of the second layer 23 being the 3rd layer is preferably not less than 0.5 nor more than 2.

When the first layer 21 (as a 1st layer), the second layer 23 (as a 2nd layer), the first layer 21 (as a 3rd layer), and the second layer 23 (as a 4th layer) are provided in order from the outside as illustrated in FIG. 6, the following configuration is preferable. A ratio ($T_{52}/T_{51}$) between an average thickness ($T_{51}$) of the first layer 21 being the 1st layer and an average thickness ($T_{52}$) of the second layer 23 being the 2nd layer is preferably not less than 0.3 nor more than 1. A ratio ($T_{53}/T_{51}$) between the average thickness ($T_{51}$) of the first layer 21 being the 1st layer and an average thickness ($T_{53}$) of the first layer 21 being the 3rd layer is preferably not less than 0.3 nor more than 3. A ratio ($T_{54}/T_{51}$) between the average thickness ($T_{51}$) of the first layer 21 being the 1st layer and an average thickness ($T_{54}$) of the second layer 23 being the 4th layer is preferably not less than 0.3 nor more than 2.

When the second layer 23 (as a 1st layer), the first layer 21 (as a 2nd layer), the second layer 23 (as a 3rd layer), and the first layer 21 (as a 4th layer) are provided in order from the outside as illustrated in FIG. 7, the following configuration is preferable. A ratio ($T_{62}/T_{61}$) between an average thickness ($T_{61}$) of the second layer 23 being the 1st layer and an average thickness ($T_{62}$) of the first layer 21 being the 2nd layer is preferably not less than 1 nor more than 3. A ratio ($T_{63}/T_{61}$) between the average thickness ($T_{61}$) of the second layer 23 being the 1st layer and an average thickness ($T_{63}$) of the second layer 23 being the 3rd layer is preferably not less than 1 nor more than 2. A ratio ($T_{64}/T_{61}$) between the average thickness ($T_{61}$) of the second layer 23 being the 1st layer and an average thickness ($T_{64}$) of the first layer 21 being the 4th layer is preferably not less than 1 nor more than 2.

Generally, the length of the tubular portion 11 in an axial direction is preferably not less than 1 m nor more than 4 m. Further, the average thickness of the side wall part is preferably 2 mm or more regardless of the number of layers in total of the number of first layers 21 and the number of second layers 23. An average thickness of the side wall part of 2 mm or more easily ensures the strength of the channel box 10. Besides, a larger average thickness of the side wall part more easily ensures the strength but is more likely to lead to radioactivation, and therefore the average thickness of the side wall part is preferably 5 mm or less and more preferably 4 mm or less.

Next, the layers in the side wall part will be concretely described.

The first layer 21 is provided mainly to ensure the strength of the channel box 10. The first layer 21 is made of silicon carbide not complexed with silicon carbide fibers. The first layer 21 is made of silicon carbide not complexed with silicon carbide fibers, and therefore can provide sufficient strength.

The first layer 21 is preferably made of only silicon carbide because of suppressing generation of hydrogen due to the reaction with moisture, radioactivation and the like and providing sufficient strength, but may partially contain another component as necessary and within a limit without departing from the spirit of the present invention. Examples of the other component include boron, carbon, silicon, aluminum, titanium, iron, chromium, nickel, zirconium, vanadium, and calcium. The content of the other component is preferably 10 mass % or less of the whole first layer 21, more preferably 5 mass % or less, and furthermore preferably 2 mass % or less.

The average thickness of the first layer 21 is preferably 50 µm or more regardless of the number of layers in total of the number of first layers 21 and the number of second layers 23. An average thickness of the first layer 21 of 50 µm or more easily ensures the strength of the channel box 10. The average thickness of the first layer 21 is more preferably 100 µm or more regardless of the number of layers in total of the number of first layers 21 and the number of second layers 23.

The average thickness of the first layer 21 is preferably adjusted as necessary according to the number of first layers 21 in the side wall part. Basically, it is preferable that the average thickness of the first layer 21 becomes larger with a smaller number of first layers 21 in the side wall part. For example, in the case where the number of first layers 21 in the side wall part is one, the average thickness of the first layer 21 is more preferably 500 μm or more, and furthermore preferably 1000 μm or more from the viewpoint of ensuring the strength of the channel box 10.

Note that a larger average thickness of the first layer 21 is more preferable from the viewpoint of ensuring the strength of the channel box 10, and is not always limited from such a viewpoint. However, the average thickness of the side wall part is generally about 2 mm to 5 mm, and therefore the upper limit of the average thickness of the first layer 21 is preferably adjusted to make the average thickness of the side wall part to about 2 mm to 5 mm. In this event, it is preferable to take into consideration the number of layers in total of the number of first layers 21 and the number of second layers 23 and the ratio between the above-described average thicknesses of the first layer 21 and the number of second layer 23.

The second layer 23 is provided to prevent fracture of the whole channel box 10 by suppressing progress of fracture of the first layer 21 in a serious accident of the nuclear reactor such as natural disaster such as tsunami or flood, or human disaster such as terror, namely, in the case where a load or a thermal shock exceeding the design basis is applied thereon.

The second layer 23 has silicon carbide fibers, and silicon carbide complexed with the silicon carbide fibers. Thus, for example, the second layer 23 undergoes ductile fracture and is combined with a layer such as the first layer 21 that undergoes brittle fracture, and thereby can suppress progress of the fracture.

In the second layer 23, for example, a matrix is composed of silicon carbide, and silicon carbide fibers are disposed in the matrix composed of silicon carbide. Note that a space between the silicon carbide fibers does not need to be completely filled with the matrix composed of silicon carbide but may have pores.

Also the matrix in the second layer 23 is preferably made of only silicon carbide because of suppressing generation of hydrogen due to the reaction with moisture, radioactivation and the like and providing sufficient strength, but may partially contain another component as necessary and within a limit without departing from the spirit of the present invention. Examples of the other component include boron nitride, carbon, mica-based mineral, aluminum oxide, boron, silicon, aluminum, titanium, iron, chromium, nickel, zirconium, vanadium, and calcium. The content of the other component is preferably 10 mass % or less of the whole matrix, more preferably 5 mass % or less, and furthermore preferably 2 mass % or less.

As the silicon carbide fiber in the second layer 23, generally, the one having a fiber diameter of 5 μm to 150 μm is preferably used. When the fiber diameter is 5 μm or more, improvement in the characteristics due to complex with the silicon carbide fibers becomes remarkable. When the fiber diameter is 150 μm or less, generation of excessive stress on the boundary surface between the matrix and the silicon carbide fibers is suppressed to suppress the fracture of the matrix. The fiber diameter is more preferably 5 μm to 100 μm, and furthermore preferably 5 μm to 15 μm.

The silicon carbide fiber in the second layer 23 is preferably a long fiber. Note that the long fiber only needs to be a continuous fiber, and is not always limited in fiber length. A longer continuous silicon carbide fiber is more preferable because of increasing the fracture toughness and the fracture energy.

Generally, the silicon carbide fibers in a state of a fiber bundle made by bundling about 100 to 10000 silicon carbide fibers are disposed in the matrix composed of silicon carbide. In the second layer 23, preferably, such fiber bundles continue. For example, in the second layer 23, preferably, one continuous fiber bundle constitutes the whole. In such a case, in particular, the fracture toughness and the fracture energy increase.

Note that the fibers included in the second layer 23 are preferably composed of only silicon carbide fibers because of suppressing generation of hydrogen due to the reaction with moisture, radioactivation and the like and providing sufficient strength, but may partially contain other fibers as necessary and within a limit without departing from the spirit of the present invention. Examples of the other fibers include carbon, alumina, and the like. The content of the other fibers is preferably 10 mass % or less of the whole fibers in the second layer 23, more preferably 5 mass % or less, and furthermore preferably 2 mass % or less.

The silicon carbide fibers are preferably contained by 20 vol % or more in the whole volume of the second layer 23. Here, the volume of the second layer 23 includes the volume of the pores in addition to the volumes of the matrix composed of silicon carbide and the silicon carbide fibers. Further, when a lubricant layer is provided on the surface of the silicon carbide fibers as will be described later, the volume of the silicon carbide fibers includes the volume of the lubricant layer.

A content of the silicon carbide fibers of 20 vol % or more is preferable because of making the second layer 23 more likely to undergo ductile fracture. Further, the content of the silicon carbide fibers is preferably 40 vol % or less in the whole volume of the second layer 23. When the content of the silicon carbide fibers is 40 vol % or less, the strength of the second layer 23 itself is also easily ensured.

On the surface of the silicon carbide fibers in the second layer 23, a covering layer is preferably provided which becomes an interface that weakens the bonding force. Provision of the covering layer is preferable because of improving the peeling and sliding between the silicon carbide fibers and the matrix to make the second layer 23 more likely to undergo ductile fracture. The interface weakening the bonding force is preferably boron nitride, graphite, mica-based mineral or the like. The covering layer, when made of those materials, improves, in particular, the peeling and sliding between the silicon carbide fibers and the matrix.

An average thickness of the covering layer is preferably 100 nm or more. A thickness of 100 nm or more is preferable because of improving the sliding between the matrix and the silicon carbide fibers to make the second layer 23 more likely to undergo ductile fracture. Further, the average thickness of the covering layer is preferably 1 μm or less. When the thickness is 1 μm or less, a decrease in the strength of the second layer 23 is suppressed.

The average thickness of the second layers 23 is preferably 300 μm or more regardless of the number of layers in total of the number of first layers 21 and the number of second layers 23. When the average thickness of the second layers 23 is 300 μm or more, progress of fracture of the first layer 21 can be effectively suppressed also when it undergoes fracture.

The average thickness of the second layer 23 is preferably decided appropriately according to the number of second layers 23 in the side wall part. Basically, it is preferable that the average thickness of the second layer 23 becomes larger with a smaller number of second layers 23 in the side wall part. For example, in the case where the number of second layers 23 in the side wall part is one, the average thickness of the second layer 23 is more preferably 500 µm or more, and furthermore preferably 1000 µm or more from the viewpoint of suppressing the progress of fracture.

Note that a larger average thickness of the second layer 23 is more preferable from the viewpoint of suppressing the progress of fracture, and is not always limited from such a viewpoint. However, the average thickness of the side wall is generally about 2 mm to 5 mm, and therefore the upper limit of the average thickness of the second layer 23 is preferably adjusted to make the average thickness of the side wall part to about 2 mm to 5 mm. In this event, it is preferable to take into consideration the number of layers in total of the number of first layers 21 and the number of second layers 23 and the ratio between the above-described average thicknesses of the first layer 21 and the second layer 23.

The intermediate layer 22 is disposed between the first layer 21 and the second layer 23, and has a solid lubricant. The intermediate layer 22 disposed between the first layer 21 and the second layer 23 functionally separates the first layer 21 and the second layer 23, effectively expressing their functions. The intermediate layer 22 disposed between the first layer 21 and the second layer 23 suppresses development of a crack occurring in the first layer 21 as it is into the second layer 23. This achieves a balance among strength, fracture toughness, and fracture energy at a higher order than that in the case where the first layer 21 and the second layer 23 are directly bonded to each other.

The interface weakening the bonding force in the intermediate layer 22 is preferably boron nitride, graphite, mica-based mineral or the like. The intermediate layer 22 made of those materials functionally satisfactorily separates, in particular, the first layer 21 and the second layer 23.

The intermediate layer 22 is made of, for example, only a solid lubricant.

When the intermediate layer 22 is made of only the solid lubricant, the average thickness of the intermediate layer 22 is preferably 7.5 µm or more. When the thickness is 7.5 µm or more, the first layer 21 and the second layer 23 are functionally sufficiently separated, effectively expressing their functions. When the intermediate layer 22 is made of only the solid lubricant, the average thickness of the intermediate layer 22 is preferably 80 µm or less. When the average thickness is 80 µm or less, the proportion of the intermediate layer 22 low in strength in the side wall part decreases, thus suppressing a decrease in the strength of the channel box 10.

Here, the bonding force of the intermediate layer 22, even when too strong or too weak, inhibits effective expression of the functions of the first layer 21 and the second layer 23. For example, when the bonding force of the intermediate layer 22 is too strong, a crack occurring in the first layer 21 develops as it is into the second layer 23, resulting in difficulty in suppressing the development of the crack. On the other hand, when the bonding force of the intermediate layer 22 is too weak, the whole strength of all of the first layer 21, the intermediate layer 22, and the second layer 23 is likely to decrease. Thus, the above-described average thickness of the intermediate layer 22 is preferable.

The intermediate layer 22 is not limited to the above-described one having a single layer structure made of only the solid lubricant, but may be the one having a stacked structure. An example of the one having the stacked structure is the one in which a second intermediate layer having silicon carbide is disposed between a pair of first intermediate layers each having the solid lubricant. The stacked structure is preferable because of suppressing excessive sliding on the intermediate layer 22.

Examples of the stacked structure of a first intermediate layer (A) made of a solid lubricant and a second intermediate layer (B) made of silicon carbide include a three-layer structure such as A/B/A, and a five-layer structure such as A/B/A/B/A. Note that as is clear from the above, in the case of the stacked structure of the first intermediate layer (A) made of a solid lubricant and the second intermediate layer (B) made of silicon carbide, the first intermediate layer (A) made of a solid lubricant is preferably disposed at both ends.

In the case where the intermediate layer 22 has the stacked structure, the average thickness of the intermediate layer 22 is preferably 7.5 µm or more. When the average thickness is 7.5 µm or more, the first layer 21 and the second layer 23 are functionally separated, sufficiently expressing their functions. In the case where the intermediate layer 22 has the stacked structure, the average thickness of the intermediate layer 22 is preferably 140 µm or less. When the average thickness is 140 µm or less, the proportion of the intermediate layer 22 low in strength in the side wall part decreases, thus suppressing a decrease in the strength of the channel box 10.

The wide wall part is basically composed of the first layer 21, the intermediate layer 22, and the second layer 23, but may be provided with another layer as necessary and without departing from the spirit of the present invention.

An example of the other layer is a protective layer provided at least one surface selected from the outside and the inside of the side wall part. When the protective layer is provided, generation of hydrogen due to the reaction with moisture is further suppressed.

The protective layer preferably contains at least one kind selected from silicon carbide and alumina. The protective layer containing at least one kind selected from silicon carbide and alumina further suppresses generation of hydrogen due to the reaction with moisture. In particular, the protective layer preferably contains at least one kind selected from silicon carbide and alumina by 98 mass % or more. The protective layer containing at least one kind selected from silicon carbide and alumina by 98 mass % or more furthermore suppresses generation of hydrogen due to the reaction with moisture.

The average thickness of the protective layer is preferably 10 µm or more. When the average thickness is 10 µm or more, the effect of suppressing generation of hydrogen due to the reaction with moisture becomes remarkable. The average thickness of the protective layer is preferably less than 50 µm. With an average thickness of the protective layer of merely about 50 µm, generation of hydrogen due to the reaction with moisture is sufficiently suppressed, and an average thickness of less than 50 µm leads to better productivity of the protective layer.

Next, a method of manufacturing the channel box 10 in the embodiment will be described.

The channel box 10 can be manufactured, for example, by sequentially stacking the first layer 21, the intermediate layer 22, the second layer 23 and so on in a predetermined order on the outside surface using a mold having the outside shape similar to the inside shape of the channel box 10, and then removing the mold by pulling out the mold. Note that the taking-out of the mold is not always performed after forming all of the layers but may be performed at a middle stage as long as the shape can be maintained.

The first layer 21, the intermediate layer 22, the covering layer, and the protective layer are preferably formed by the CVD method (Chemical Vapor Deposition) or the PVD method (Physical Vapor Deposition), and particularly preferably formed by the CVD method. The second layer 23 is preferably formed by the CVI method (Chemical Vapor Infiltration).

The formation of the second layer 23 by the CVI method is performed as follows for instance.

First, a fiber bundle made by bundling a plurality of silicon carbide fibers is formed by the filament winding method, the braiding method, a method of stacking woven fabric or non-woven fabric or the like to manufacture a fiber base having a tubular shape such as a circular tubular shape, a square tubular shape, or the like.

In the case of the filament winding method, the fiber bundle is wound in an axial direction, a circumferential direction, a bias direction and the like on the base of the mold or the like to form the fiber base in the tubular shape. In this case, the fiber bundle preferably continues in the whole second layer 23.

In the case of the braiding method, the fiber bundle is braided into the tubular shape to surround the base of the mold or the like from one end portion to the other end portion in the axial direction of the base of the mold or the like to form the fiber base in a predetermined shape.

In the case of the method of stacking woven fabric or non-woven fabric, the fiber bundle is made into a fabric and the fabric is stacked to be wound around the base of the mold or the like to form the fiber base in the tubular shape. Examples of the fabric include plane weave fabric, stain fabric and so on.

After manufacturing the fiber base in the tubular shape, the CVD reaction is caused in voids of fine pores of the fiber base to grow the matrix component, thereby filling the voids of fine pores. This forms the second layer 23.

Next, a modification example of the channel box 10 in the first embodiment will be described.

Figure 8:
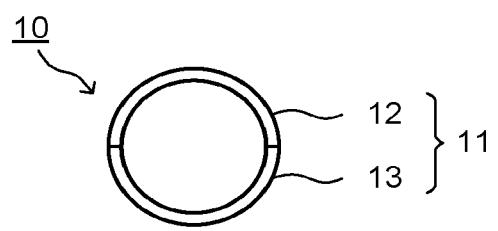
FIG. 8 is a view illustrating a first modification example of the channel box in the first embodiment (in a non-separated state).
Figure 9:
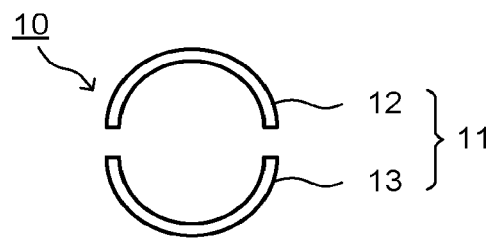
FIG. 9 is a view illustrating the first modification example of the channel box in the first embodiment (in a separated state).

FIG. 8 and FIG. 9 are views illustrating a first modification example of the channel box 10 in the first embodiment. Here, FIG. 8 illustrates a non-separated state, and FIG. 9 illustrates a separated state. The channel box 10 may be divided into two or more parts in the circumferential direction. For example, as illustrated in the drawings, the channel box 10 may be divided by a plane including a center axis into two parts such as a first circumferentially divided body 12 and a second circumferentially divided body 13 and may be constituted by combining them. Further, though not illustrated, the channel box 10 may be divided into three or more parts in the circumferential direction.

Figure 10:
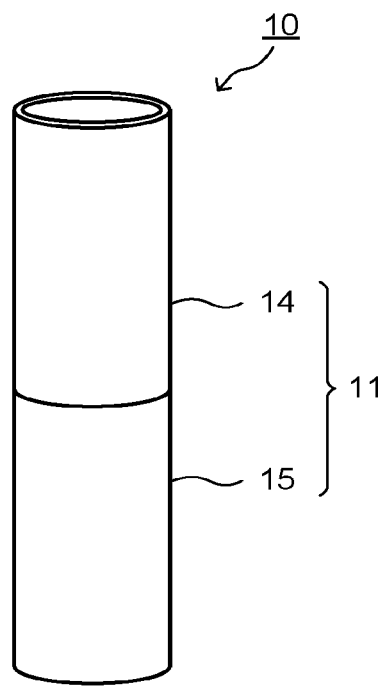
FIG. 10 is a view illustrating a second modification example of the channel box in the first embodiment (in a non-separated state).
Figure 11:
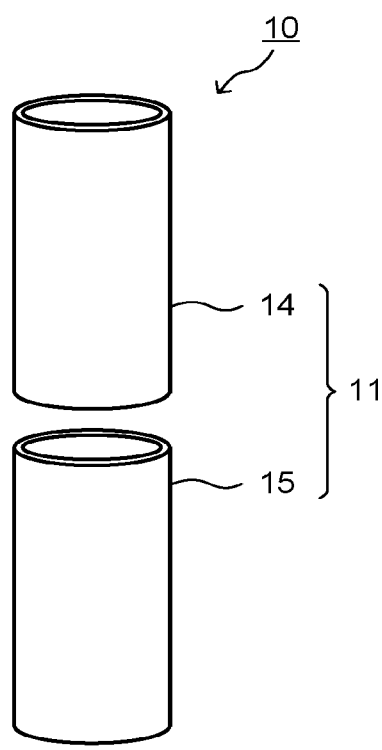
FIG. 11 is a view illustrating the second modification example of the channel box in the first embodiment (in a separated state).

FIG. 10 and FIG. 11 are views illustrating a second modification example of the channel box 10 in the first embodiment. Here, FIG. 10 and FIG. 11 are views illustrating the channel box 10 divided into two parts in the axial direction, FIG. 10 illustrates a non-separated state, and FIG. 11 illustrates a separated state. As illustrated in FIG. 10 and FIG. 11, the channel box 10 may be divided into two parts such as a first axially divided body 14 and a second axially divided body 15 and may be constituted by combining them in the axial direction.

Figure 12:
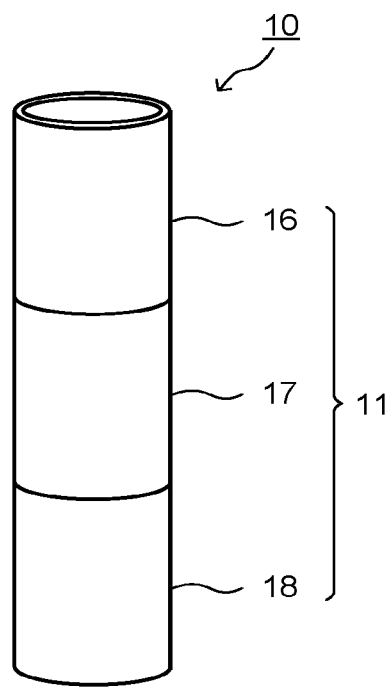
FIG. 12 is a view illustrating a third modification example of the channel box in the first embodiment (in a non-separated state).
Figure 13:
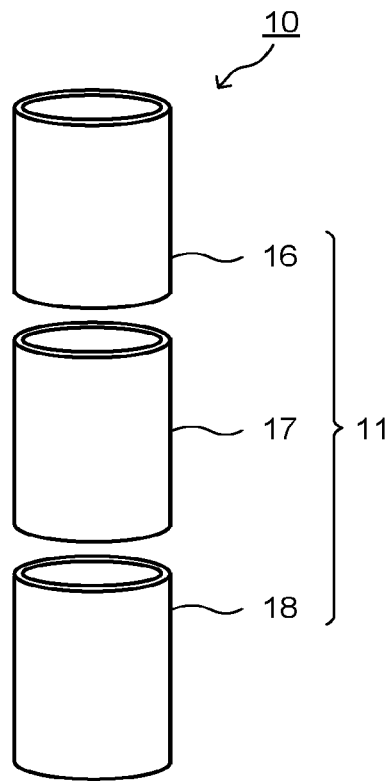
FIG. 13 is a view illustrating the third modification example of the channel box in the first embodiment (in a separated state).

FIG. 12 and FIG. 13 are views illustrating a third modification example of the channel box 10 in the first embodiment. Here, FIG. 12 and FIG. 13 are views illustrating the channel box 10 divided into three parts in the axial direction, FIG. 12 illustrates a non-separated state, and FIG. 13 illustrates a separated state. As illustrated in FIG. 12 and FIG. 13, the channel box 10 may be divided into three parts such as a first axially divided body 16, a second axially divided body 17, and a third axially divided body 18 and may be constituted by combining them in the axial direction.

Note that the channel box 10 in the first embodiment may be divided into four or more parts in the axial direction. Further, when the channel box 10 in the first embodiment is divided in the axial direction, the length in the axial direction of each of the divided parts is generally preferably 1 m or more.

Next, a channel box 10 in a second embodiment will be described.

Figure 14:
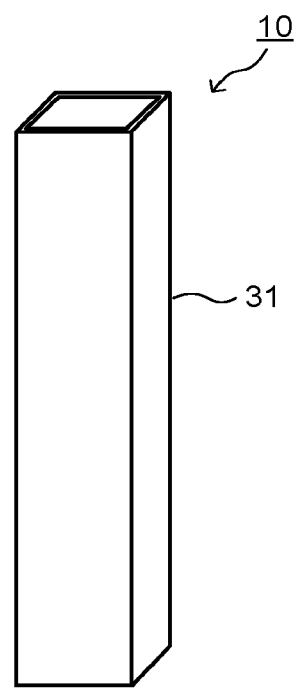
FIG. 14 is an external view illustrating a channel box in a second embodiment.

FIG. 14 is an external view illustrating a channel box 10 in the second embodiment.

The channel box 10 in the second embodiment has a tubular portion 31 in a square tubular shape.

Note that the stacked structure of the side wall part of the channel box 10 in the second embodiment can employ the stacked structure of the side wall part of the channel box 10 in the first embodiment, and therefore its description will be omitted.

Figure 15:
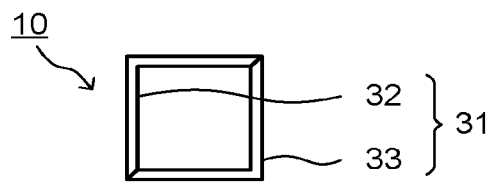
FIG. 15 is a view illustrating a first modification example of the channel box in the second embodiment (in a non-separated state).
Figure 16:
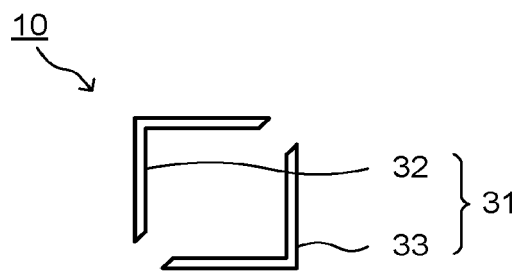
FIG. 16 is a view illustrating the first modification example of the channel box in the second embodiment (in a separated state).

FIG. 15 and FIG. 16 are views illustrating a first modification example of the channel box in the second embodiment. Here, FIG. 15 illustrates a non-separated state, and FIG. 16 illustrates a separated state. The channel box 10 in the second embodiment may also be divided into two or more parts in the circumferential direction. For example, as illustrated in the drawings, the channel box 10 may be divided by a plane including a diagonal line into two parts such as a first circumferentially divided body 32 and a second circumferentially divided body 33 and may be constituted by combining them. Further, though not illustrated, the channel box 10 may be divided into three or more parts in the circumferential direction.

Figure 17:
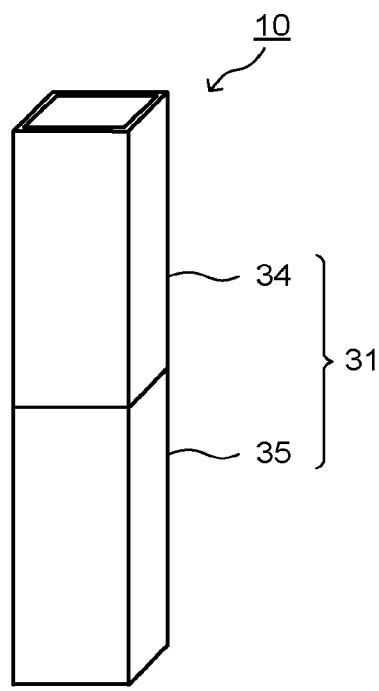
FIG. 17 is a view illustrating a second modification example of the channel box in the second embodiment (in a non-separated state).
Figure 18:
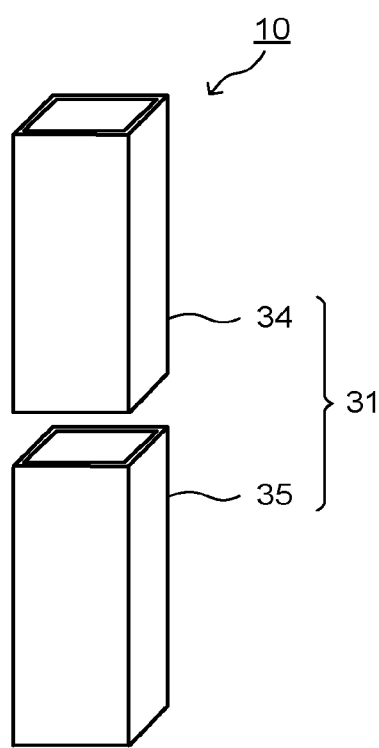
FIG. 18 is a view illustrating the second modification example of the channel box in the second embodiment (in a separated state).

FIG. 17 and FIG. 18 are views illustrating an example of the dividing method in the axial direction of the channel box 10 in the second embodiment. Here, FIG. 17 and FIG. 18 are views illustrating the channel box 10 divided into two parts in the axial direction, FIG. 17 illustrates a non-separated state, and FIG. 18 illustrates a separated state. As illustrated in FIG. 17 and FIG. 18, the channel box 10 may be divided into two parts such as a first axially divided body 34 and a second axially divided body 35 and may be constituted by combining them in the axial direction.

Figure 19:
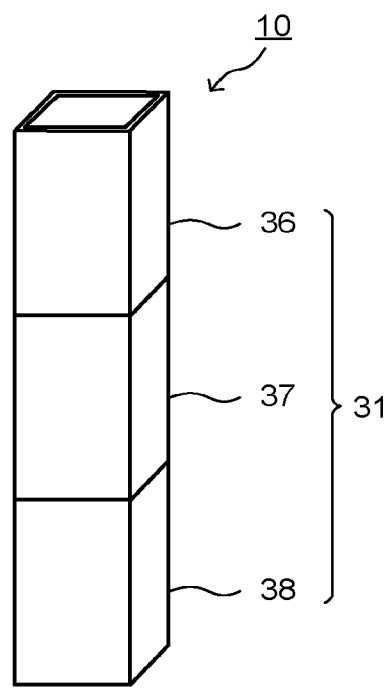
FIG. 19 is a view illustrating a third modification example of the channel box in the second embodiment (in a non-separated state).
Figure 20:
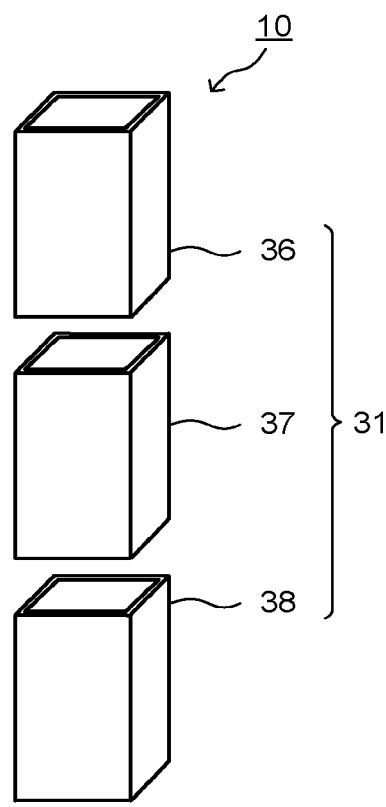
FIG. 20 is a view illustrating the third modification example of the channel box in the second embodiment (in a separated state).
Figure 21:
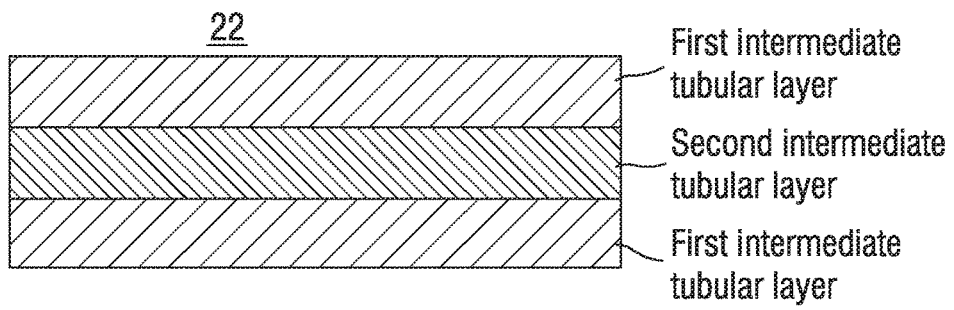
FIG. 21 is a view illustrating a cross section of the intermediate tubular layer.
Figure 22:
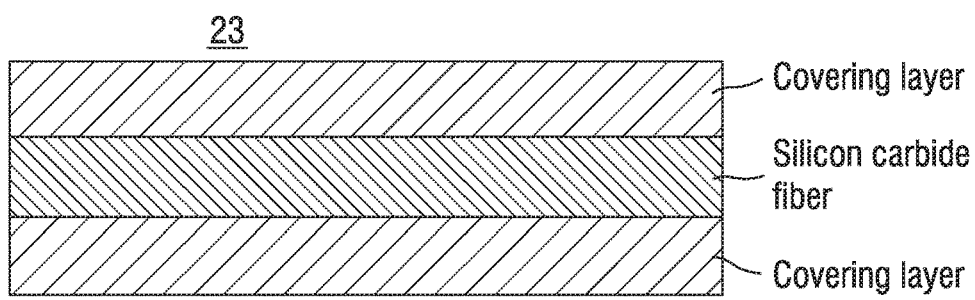
FIG. 22 is a view illustrating a cross section of the second tubular layer.
Figure 23:
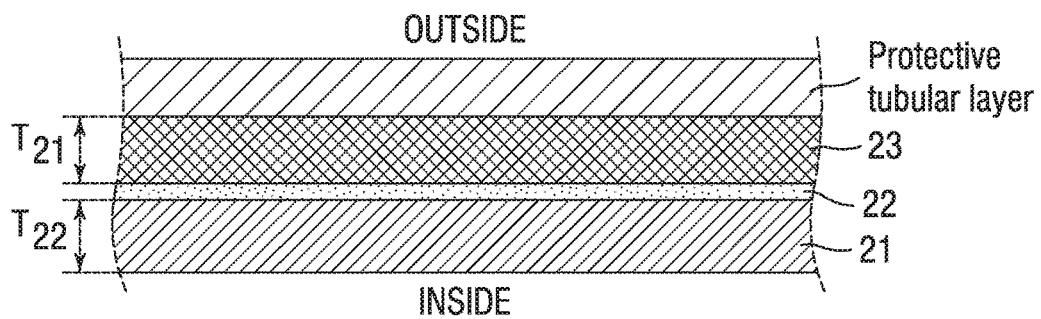
FIG. 23 is a view illustrating a cross section of a modification of the channel box of FIG. 3.

FIG. 19 and FIG. 20 are views illustrating another example of the dividing method in the axial direction of the channel box 10 in the second embodiment. Here, FIG. 19 and FIG. 20 are views illustrating the channel box 10 divided into three parts in the axial direction, FIG. 19 illustrates a non-separated state, and FIG. 20 illustrates a separated state. As illustrated in FIG. 19 and FIG. 20, the channel box 10 may be divided into three parts such as a first axially divided body 36, a second axially divided body 37, and a third axially divided body 38 and may be constituted by combining them in the axial direction.

Note that the channel box 10 in the second embodiment may be divided into four or more parts in the axial direction. Further, when the channel box 10 in the second embodiment is divided in the axial direction, the length in axial direction of each of the divided parts is generally preferably 1 m or more.

EXAMPLES

Example 1

As the carbon mold, the one having the outside shape similar to the inside shape of the channel box was prepared.

After the carbon mold was placed in a furnace, a layer made of silicon carbide (hereinafter, described as a SiC layer) having an average thickness of 1.2 mm was formed on the side surface thereof by the CVD method. Here, as a source gas in forming the SiC layer, $SiCl_4$ and $C_3H_8$ were used. Further, the temperature in forming the SiC layer was set to 1300° C. to 1400° C. and the pressure was set to 4 Pa to 40 Pa.

Further, a layer made of boron nitride (hereinafter, described as a BN layer) having an average thickness of 10 μm to 50 μm was formed on the SiC layer. As a source gas in forming the BN layer, $BCl_3$ and $NH_3$ were used. Further, the temperature in forming the BN layer was set to 1750° C. to 1850° C. and the pressure was set to 50 Pa to 500 Pa. Thereafter, the carbon mold on which the SiC layer and the BN layer were formed was taken out of the furnace.

Separately, eight satin cloths were prepared using long silicon carbide fibers (manufactured by Nippon Carbon Co., Ltd., tradename: Hi-Nicaron S) having a diameter of 12 μm with graphite having an average thickness of about 1 μm formed on the surface thereof by the CVD method. The eight satin cloths were wound while being stacked on the above-described BN layer of the carbon mold into a fiber base.

Further, a matrix containing silicon carbide as a major component was formed in the voids of the fine pores of the fiber base using $SiCl_4$ and $C_3H_8$ as the source gas under the conditions of a temperature of 1300° C. to 1400° C. and a pressure of 4 Pa to 40 Pa, thereby forming a layer (hereinafter, described as a SiC/SiC layer) having an average thickness of 1 mm and made of silicon carbide complexed with silicon carbide fibers. The proportion of the silicon carbide fibers in the SiC/SiC layer is in a rage of 20 vol % to 40 vol %.

Thereafter, the carbon mold was removed to thereby manufacture a channel box having a tubular portion in which the SiC/SiC layer, the BN layer, and the SiC layer were disposed from the outside. Here, the SiC layer corresponds to the first layer, the BN layer corresponds to the intermediate layer, and the SiC/SiC layer corresponds to the second layer. Further, the length of the channel box is 2.3 mm.

Example 2

On the SiC/SiC layer in the channel box in Example 1, a protective layer made of silicon carbide having an average thickness of 10 μm to 50 μm was formed by the CVD method. Here, as a source gas in forming the protective layer, $SiCl_4$ and $C_3H_8$ were used. Further, the temperature in forming the protective layer was set to 1300° C. to 1400° C. and the pressure was set to 4 Pa to 40 Pa.

Comparative Example 1

A channel box having a side wall part made of only a zirconium base alloy layer was manufactured. Note that the thickness of the zirconium base alloy layer was set to 2.3 mm.

Comparative Example 2

A channel box having a side wall part made of only a SiC layer was manufactured. Note that the formation of the SiC layer was performed similarly to the formation of the SiC layer in the channel box in Example 1. Further, the average thickness of the SiC layer was set to 2.3 mm.

Comparative Example 3

A channel box having a side wall part made of only a SiC/SiC layer was manufactured. Note that the formation of the SiC/SiC layer was performed similarly to the formation of the SiC/SiC layer in the channel box in Example 1. Further, the average thickness of the SiC/SiC layer was set to 2.3 mm.

Comparative Example 4

A channel box having a tubular portion in which the SiC/SiC layer and the SiC layer were disposed from the outside was manufactured. Note that this channel box was manufactured similarly to the channel box in Example 1 except that the BN layer was not formed. Further, the average thicknesses of the SiC/SiC layer and the SiC layer were the same as the average thicknesses of the SiC/SiC layer and the SiC layer in Example 1.

Next, the channel boxes in Examples 1, 2, and Comparative Examples 1 to 4 were subjected to a strength test, a high-temperature steam oxidation test, and a thermal shock test by the following methods. These test results are listed in Table 1.

(Strength Test)

A bending test conventionally performed on the channel box made of zirconium base alloy, was carried out on the channel boxes in examples and comparative examples. In the table, the evaluation criteria are as follows.

"a": having a strength of about twice the conventional requirement specification
"b": satisfying the conventional requirement specification
"c": not satisfying the conventional requirement specification
"d": not at all satisfying the conventional requirement specification (Thermal Shock Test)

The channel boxes in examples and comparative examples were heated to 1200° C. and then put in water, and subjected to observation of shape change. In the table, the evaluation criteria are as follows.

"a": shape is completely kept
"b": shape is kept
"c": shape is partially not kept
"d": shape is not kept (High-Temperature Steam Oxidation Test)

The high-temperature steam oxidation test was carried out by keeping the channel boxes in examples and comparative examples in a steam atmosphere at 1300° C. for 48 hours. In the table, the evaluation criteria are as follows.

"a": generation of hydrogen is not observed
"b": the generation amount of hydrogen satisfies the requirement specification
"c": the generation amount of hydrogen does not satisfy the requirement specification
"d": the generation amount of hydrogen do not at all satisfy the requirement specification

TABLE 1

| | Layer Structure | Strength Test | Thermal Shock Test | High-Temperature Steam Oxidation Test |
|---|---|---|---|---|
| Example 1 | Sic Layer, Bn Layer, Sic/Sic Layer | b | b | b |
| Example 2 | Sic Layer, Bn Layer, Sic/Sic Layer, Protective Layer | b | b | a |
| Comparative | Zirconium Base Alloy | b | b | d |

TABLE 1-continued

| | Layer Structure | Strength Test | Thermal Shock Test | High-Temperature Steam Oxidation Test |
|---|---|---|---|---|
| Example 1 | Layer | | | |
| Comparative Example 2 | Sic Layer | a | d | b |
| Comparative Example 3 | Sic/Sic Layer | d | a | b |
| Comparative Example 4 | Sic Layer, Sic/Sic Layer | c | c | b |

As is clear from Table 1, in the channel box in Comparative Example 1 composed of only the zirconium base alloy layer, generation of hydrogen is observed. Further, the channel box in Comparative Example 2 composed of only the SiC layer is insufficient in resistance against the thermal shock. Further, the channel box in Comparative Example 3 composed of only the SiC/SiC layer does not have a sufficient strength. Further, the channel box in Comparative Example 4 composed of the SiC layer having no BN layer and the SiC/SiC layer is insufficient in strength and resistance against the thermal shock.

On the other hand, the channel box in Example 1 composed of the SiC/SiC layer and the SiC layer stacked via the BN layer suppresses generation of hydrogen and is sufficient in strength and resistance against the thermal shock. Further, the channel box in Example 2 having the protective layer suppresses, in particular, generation of hydrogen.

According to the above-described embodiments, there is provided a channel box suppressing generation of hydrogen due to the reaction with moisture, and achieving a balance among strength, fracture toughness, and fracture energy at a high order.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

What is claimed is:

1. A channel box for a fuel assembly of a boiling water reactor nuclear power plant, comprising
a tubular portion including:
   a first tubular layer containing silicon carbide;
   a second tubular layer in parallel to and surrounding or surrounded by the first tubular layer and containing silicon carbide complexed with silicon carbide fibers; and
   an intermediate tubular layer disposed between the first and second tubular layers and containing a solid lubricant of at least one selected from graphite and mica-based mineral and functionally separating the first tubular layer and the second tubular layer such that the first tubular layer ensures the strength and the second tubular layer suppresses fracture when a load or a thermal shock is applied.

2. The channel box according to claim 1,
wherein the intermediate tubular layer includes:
   a pair of first intermediate tubular layers each containing a solid lubricant, and
   a second intermediate tubular layer disposed between the first intermediate layers and containing silicon carbide.

3. The channel box according to claim 1,
wherein the second tubular layer includes a covering layer surrounding the silicon carbide fibers.

4. The channel box according to claim 3,
wherein the covering layer contains at least one selected from boron nitride, graphite, and mica-based mineral.

5. The channel box according to claim 1,
wherein the first tubular layer is a chemical vapor deposition layer, and the second tubular layer is a chemical vapor infiltration layer.

6. The channel box according to claim 1,
wherein the silicon carbide fibers in the second tubular layer comprise winded fibers, braided fibers, stacked woven, or non-woven fabric.

7. The channel box according to claim 1, further including
a protective tubular layer surrounding an outer side of the tubular portion and containing 98 mass % or more of at least one selected from silicon carbide and alumina.

8. The channel box according to claim 7,
wherein the protective tubular layer has an average thickness of 10 μm or more and 50 μm or less.

9. The channel box according to claim 1,
wherein the first, intermediate, and second tubular layers are disposed in order from an outer side to an inner side of the tubular portion.

10. The channel box according to claim 9,
wherein the tubular portion further includes a plurality of the intermediate tubular layers and a plurality of the first tubular layers,
wherein the first, intermediate, second, intermediate, first tubular layers are disposed in order from the outer side to the inner side of the tubular portion.

11. The channel box according to claim 10,
wherein the tubular portion further includes a plurality of the second tubular layers,
wherein the first, intermediate, second, intermediate, first, intermediate, second tubular layers are disposed in order from the outer side to the inner side of the tubular portion.

12. The channel box according to claim 1,
wherein the second, intermediate, and first tubular layers are disposed in order from an outer side to an inner side of the tubular portion.

13. The channel box according to claim 12,
wherein the tubular portion further includes a plurality of the intermediate tubular layers and a plurality of the second tubular layers,
wherein the second, intermediate, first, intermediate, second tubular layers are disposed in order from the outer side to the inner side of the tubular portion.

14. The channel box according to claim 13,
wherein the tubular portion further includes a plurality of the first tubular layers,
wherein the second, intermediate, first, intermediate, second, intermediate, first tubular layers are disposed in order from the outer side to the inner side of the tubular portion.

15. The channel box according to claim 1,
wherein the tubular portion is divided into a plurality of parts in a circumferential direction.

16. The channel box according to claim 1,
wherein the tubular portion has a length in an axial direction of 1 m or more and 4 m or less.

17. The channel box according to claim 1,
wherein the tubular portion is divided into a plurality of parts in an axial direction.

18. The channel box according to claim 1,
wherein the tubular portion has an average thickness of 2 mm or more and 4 mm or less.

* * * * *